(12) United States Patent
Mavridis

(10) Patent No.: US 7,608,327 B2
(45) Date of Patent: Oct. 27, 2009

(54) HIGH TEAR STRENGTH FILM

(75) Inventor: Harilaos Mavridis, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 544 days.

(21) Appl. No.: 11/312,033

(22) Filed: Dec. 20, 2005

(65) Prior Publication Data

US 2007/0142558 A1    Jun. 21, 2007

(51) Int. Cl.
  *B32B 17/10* (2006.01)
  *C08L 23/06* (2006.01)
  *C08L 23/16* (2006.01)
  *B28B 3/20* (2006.01)
(52) U.S. Cl. .................. 428/334; 525/240; 264/176.1
(58) Field of Classification Search ................ 428/334; 525/240; 264/176.1
  See application file for complete search history.

(56) References Cited

U.S. PATENT DOCUMENTS

| 4,331,586 A | 5/1982 | Hardy | 525/186 |
| 4,346,834 A | 8/1982 | Mazumdar | 229/54 R |
| 4,483,938 A | 11/1984 | Rees | 502/113 |
| 4,752,597 A | 6/1988 | Turner | 502/104 |
| 4,791,180 A | 12/1988 | Turner | 526/160 |
| 4,812,500 A | 3/1989 | Hayden | 524/99 |
| 5,064,802 A | 11/1991 | Stevens et al. | 502/155 |
| 5,539,124 A | 7/1996 | Etherton et al. | 548/402 |
| 5,554,775 A | 9/1996 | Krishnamurti et al. | 556/7 |
| 5,637,660 A | 6/1997 | Nagy et al. | 526/160 |
| 5,714,547 A | 2/1998 | Li et al. | 525/240 |
| 5,902,866 A | 5/1999 | Nagy et al. | 526/133 |
| 5,962,598 A | 10/1999 | Mack et al. | 525/333.8 |
| 6,171,993 B1 | 1/2001 | Mavridis et al. | 502/103 |
| 6,211,311 B1 | 4/2001 | Wang et al. | 526/131 |
| 6,232,260 B1 | 5/2001 | Nagy et al. | 502/155 |
| 6,355,733 B1 | 3/2002 | Williams et al. | 525/191 |
| 6,562,425 B2 * | 5/2003 | Denehy et al. | 428/36.6 |
| 6,649,698 B1 | 11/2003 | Mehta | 525/191 |
| 7,230,054 B2 * | 6/2007 | Mavridis et al. | 525/240 |

FOREIGN PATENT DOCUMENTS

| WO | WO 02/055600 | 7/2002 |
| WO | WO 03/064519 | 8/2003 |
| WO | WO 03/099922 | 12/2003 |

* cited by examiner

*Primary Examiner*—Nathan M Nutter
(74) *Attorney, Agent, or Firm*—John Tyrell; Jonathan L. Schuchardt

(57) ABSTRACT

A thick film produced from a polyolefin blend is disclosed. The film is prepared from a blend having a density from 0.935 to 0.955 g/cm$^3$ and comprising LLDPE and greater than 50% by weight HDPE having a density greater than 0.955 g/cm$^3$. The film has a modulus in the machine direction from about 75,000 to about 130,000 psi and improved machine direction tear strength.

8 Claims, No Drawings

HIGH TEAR STRENGTH FILM

FIELD OF THE INVENTION

The invention relates to films produced from polyolefin blends. The blends comprise a high molecular weight, high density polyethylene (HDPE) and a linear low density polyethylene (LLDPE).

BACKGROUND OF THE INVENTION

Polyolefin blends are well known. Films from polyolefin blends are known, but because property requirements vary with different applications and because film properties such as tear strength are based upon tradeoffs between processing, thickness, and modulus, further improvements are needed. U.S. Pat. No. 6,649,698 discloses blends of high molecular weight HDPE with LLDPE and their improved environmental stress crack resistance. The blends are used as geomembranes (polymer sheets used as environmental barriers) and pipes. Environmental stress crack data is given, but there are no other reported properties of the blends. There is nothing disclosed about thick films. There is no indication of improved tear strength.

Thin films have been studied for applications such as grocery sacks. U.S. Pat. No. 4,346,834 improves the thin film (preferably between 20 and 40 microns) properties of LDPE by blending 5-20% by weight HDPE and LLDPE with the LDPE to provide a ternary blend. All of the blends contain LDPE and there is nothing disclosed about thick films.

U.S. Pat. No. 6,355,733 discloses a blend of LLDPE with medium density polyethylene having multimodal molecular weight distribution. The reported blends have a low modulus (examples range from 52,000 to 62,000 psi) and a low density (examples range from 0.927 to 0.931 g/cm$^3$). The disclosure states that HDPE blends with LLDPE do not usually perform synergistically and solves this problem by using MDPE with multimodal distribution.

Despite the considerable amount of work done with polyolefin blends, apparently thick films with high machine direction tear strength, density from 0.935 to 0.955 g/cm$^3$, and modulus from about 75,000 psi to about 130,000 psi have not been prepared from HDPE and LLDPE blends.

SUMMARY OF THE INVENTION

The invention is a thick film produced from a polyolefin blend. The blend has a density from 0.935 to 0.955 g/cm$^3$ and comprises LLDPE and greater than 50% by weight HDPE having a density greater than 0.955 g/cm$^3$. The film has a modulus in the machine direction from about 75,000 to about 130,000 psi and improved machine direction tear strength.

DETAILED DESCRIPTION OF THE INVENTION

The invention is a thick film produced from a polyolefin blend. The blend comprises linear low density polyethylene (LLDPE) and greater than 50% by weight of a high density polyethylene (HDPE). The HDPE has a density greater than 0.955 g/cm$^3$. The HDPE may include small amounts of an alpha-olefin, such as propylene, 1-butene, 1-hexene, 1-octene and the like copolymerized with the ethylene. The HDPE has a high molecular weight. One indirect indication of molecular weight is melt index (MI$_2$). Generally, as molecular weight increases, MI$_2$ decreases. MI$_2$ is measured by ASTM D1238 under a load of 2.16 kg. The HDPE has an MI$_2$ less than 1.0 dg/min. HDPE can be produced by several processes including slurry, solution and gas-phase polymerizations and with numerous olefin-polymerization catalysts. Preferably, the olefin polymerization catalyst is a metallocene, non-metallocene single-site, or Ziegler-Natta catalyst comprising a Group 4-10 transition metal compound.

Metallocene catalysts include those containing substituted and unsubstituted cyclopentadienyl, fluorenyl, or indenyl ligands, and the like, such as those described in U.S. Pat. Nos. 4,791,180 and 4,752,597, the teachings of which are incorporated herein by reference.

Non-metallocene single-site catalysts include the so-called "constrained geometry" catalysts (see, e.g., U.S. Pat. No. 5,064,802) and catalysts containing one or more heteroatomic ring ligands such as boraaryl, pyrrolyl, indolyl, indenoindolyl, quinolinyl, pyridinyl, and azaborolinyl as described in U.S. Pat. Nos. 5,554,775, 5,539,124, 5,637,660, 5,902,866, and 6,232,260, the teachings of which are incorporated herein by reference.

More preferably, the olefin polymerization catalyst is a Ziegler-Natta catalyst. They include titanium halides, titanium alkoxides, vanadium halides, and mixtures thereof, especially, TiCl$_3$, TiCl$_4$, mixtures of VOCl$_3$ with TiCl$_4$, and mixtures of VCl$_4$ with TiCl$_4$. Suitable Ziegler-Natta catalysts appear in U.S. Pat. No. 4,483,938, the teachings of which are incorporated herein by reference.

Optionally, the olefin polymerization catalyst is supported. Suitable support materials include silica, alumina, and magnesium chloride. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C. and more preferably from about 150 to about 600° C. prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The blend also comprises a linear low density polyethylene (LLDPE). The LLDPE has a density from 0.900 g/cm$^3$ to 0.925 g/cm$^3$ and an MI$_2$ less than 5.0 dg/min, preferably from 0.5 to 2.0 dg/min. Preferably, the blend has from about 10 to about 49 percent by weight LLDPE. Preferably, the LLDPE is a copolymer of ethylene with 1-hexene. LLDPE can be produced by several processes and with many olefin-polymerization catalysts. Preferably, the olefin polymerization catalyst is a metallocene, non-metallocene single-site, or Ziegler-Natta catalyst comprising a Group 4-10 transition metal compound. U.S. Pat. No. 6,171,993 describes a preferred hexene-based LLDPE. A particularly preferred LLDPE is Petrothene® Select LLDPE, a product of Equistar Chemicals, LP, which is a hexene-based resin having a density of 0.918 g/cm$^3$ and an MI$_2$ of 0.70 dg/min.

Optionally, the blend contains a third polymer. Adding a third polymer into the blend can either enhance the performance of the product or reduce the cost. For example, addition of a third polymer may increase the printability or the clarity of the film. Suitable third polymers include polyethylene resins other than those specified above, e.g., low density polyethylene (LDPE), medium density polyethylene (MDPE), polypropylene, polyester, acrylic resin, polyvinyl alcohol, polyvinyl chloride, polyvinyl acetate, polyvinyl ether, ethylene-vinyl acetate copolymers (EVA), ethylene-vinyl alcohol copolymers (EVOH), ethylene-acrylic acid copolymers, and the like, and mixtures thereof. A third polymer is added in an amount preferably less than 10 percent by weight of the total blend.

Optionally, the blend also contains antioxidants, UV stabilizers, flow agents, or other additives. The addition of additives is well known in the art. For example, U.S. Pat. Nos. 4,086,204, 4,331,586, and 4,812,500, the teachings of which are herein incorporated by reference, teach UV stabilizers for polyolefins. Additives are added in an amount preferably less than 10 percent by weight of the entire blend.

Any suitable blending technique may be used. Preferably, the HDPE and LLDPE are combined and melt extruded. The blend has a density from 0.935 g/cm³ to 0.955 g/cm³. The blend is especially useful for preparing films. The invention is a thick film produced from the polyolefin blend. By "thick film," I mean the film has a thickness from 50 to 250 microns. Thin films generally have a thickness less than about 25 microns. When thickness exceeds 300 microns, the article is generally considered to be a sheet rather than a film.

Methods for making polyolefin films are known. For example, U.S. Pat. No. 5,962,598, the teachings of which are herein incorporated by reference, teaches how to produce biaxially oriented films made in high stalk extrusion. In the process, polyethylene melt is fed by an extruder through a die gap (0.8 to 2 mm) in an annular die to produce a molten tube that is pushed vertically upward. At this point, the molten tube is approximately the same size as the annular die. Pressurized air is fed to the interior of the tube to increase the tube diameter to give a "bubble." The volume of air injected into the tube controls the size of the tube or the resulting blow-up ratio. In high stalk extrusion, the increase in the tube diameter occurs at a height of approximately 5-12 times the die diameter. This distance is referred to as the stalk or neck height. The expanded tube produces the desired biaxial orientation of the film that results in the balance of tear and impact properties of HMW HDPE resins. The tube is rapidly cooled by a cooling ring on the outside surface of the film. The bubble is collapsed between a pair of nip rollers and wound onto a film roll by the film winder. Collapsing of the tube is done after initial cooling at a point so that the wall surfaces will not adhere to one another. Mechanical strength of the film is defined in two directions, along the polymer flow exiting the die or machine direction (MD) and perpendicular to the polymer flow exiting the die or transverse direction (TD).

Film property requirements vary from application to application, and there are generally tradeoffs in processing conditions, modulus, and tear strength. Generally, as the modulus increases, the tear strength decreases. Tear strength also can often vary based upon processing conditions. Certain processing conditions, such as neck height in high-stalk blown film extrusion, can affect the level of orientation in the polymer film. A highly oriented film often has reduced MD tear strength. It is sometimes possible, though not necessarily practical, to increase MD tear strength by increasing neck height in high-stalk blown film extrusion. However this is done at the expense of TD tear strength. For comparison purposes, it is important to compare films of the same thickness and modulus that have been processed under the same conditions.

In one aspect, the invention is a thick film that has a modulus from about 75,000 to about 130,000 psi and improved MD tear strength while maintaining the TD tear strength at a value greater than the MD tear strength. The $TS_{MD}$ is higher than that of films prepared from conventional HDPE/LLDPE blends (see Examples 1 and 2 versus Comparative Examples 5 and 6, below). As LLDPE is added to HDPE to prepare a conventional film, the $TS_{MD}$ improves, but the modulus decreases and is often unacceptably low. Films of the invention show greater $TS_{MD}$ with less concomitant deterioration of modulus. For films having a thickness of 100 microns, this can be expressed by the following equation: $TS_{MD}>1544-(11.2)(mod_{MD}/1000\ psi)$. I have derived the equation by plotting $TS_{MD}$ on the y-axis versus modulus in the machine direction on the x-axis and drawing a line with slope=−0.0112 and y intercept=1544. Conventional films exhibit $TS_{MD}$ values below the line and films of the invention have $TS_{MD}$ values above the line.

In another aspect, the invention also includes thick films, prepared from a polyolefin blend, that have tear strength in the machine direction ($TS_{MD}$) greater by at least 20% than that of a film with the same thickness and modulus prepared from a single polyethylene resin (see Examples 1 and 2 versus Comparative Examples 3 and 4, below) The polyolefin blend has a density from 0.935 to 0.955 g/cm³. The blend comprises greater than 50 wt. % of HDPE having a density greater than 0.955 g/cm³ and an $MI_2$ less than 1.0 dg/min. It also includes LLDPE having a density from 0.900 to 0.925 g/cm³ and an $MI_2$ less than 5.0 dg/min.

As demonstrated below, the benefits of the invention apply to thick films, i.e., ones having a thickness from 50 to 250 microns. We saw little variability and no improvement in machine-direction tear strength—even from polyolefin blends comprising a HDPE component having a density >0.955 g/cm³—when such blends were converted into thin films (see Comparative Example 7 and Table 1).

It is well known to those skilled in the art that for polyethylene, resin density relates to crystallinity, which in turn relates to film stiffness, or modulus. Density is measured in accordance with ASTM D1505. Blend density of two components A and B can be calculated from the densities of the components and the blend composition, with the equation: 1/(blend density)=(weight fraction of A)/(density of A)+ (weight fraction of B)/(density of B).

"Film stiffness" or "film modulus" is measured in accordance with ASTM D882 (1% secant modulus). Machine-direction tear strength ($TS_{MD}$) and transverse-direction tear strength ($TS_{TD}$) are measured in accordance with ASTM D1922.

The following examples merely illustrate the invention. Those skilled in the art will recognize many variations that are within the spirit of the invention and scope of the claims.

EXAMPLE 1

HDPE and LLDPE are dry blended in a weight ratio of 54:46 and melt extruded. The HDPE is L5906 (product of Equistar Chemicals, LP) having a density of 0.959 g/cm³ and $MI_2$ of 0.06 dg/min. The LLDPE is Petrothene® Select LLDPE (product of Equistar Chemicals, LP) a hexene-based LLDPE having a density of 0.918 g/cm³ and $MI_2$ of 0.70 dg/min. The polyolefin blend has a calculated density of 0.939 g/cm³ and is converted into a nominal 100 micron film on a blown film line at a rate of 300 pounds per hour with a 200 mm die and 1.5 mm die gap using a stalk height of 8 die diameters and a 4:1 blow-up ratio. The film has a measured thickness of 105 microns, a modulus in the machine direction of 92,300 psi, TD tear strength of 2200 grams, and MD tear strength of 820 grams.

The obtained $TS_{MD}$ of 820 g is well above the value of 510 g calculated from the equation $TS_{MD}=1544-(11.2)(mod_{MD}/1000\ psi)$.

EXAMPLE 2

The general procedure of Example 1 is repeated using HDPE and LLDPE in a weight ratio of 80:20, with a calculated blend density of 0.950 g/cm³. The film has a measured thickness of 103 microns, a modulus in the machine direction of 123,000 psi, TD tear strength of 1700 grams, and MD tear strength of 400 grams.

The obtained $TS_{MD}$ of 400 g is well above the value of 166 g calculated from the equation $TS_{MD}=1544-(11.2)(mod_{MD}/1000\ psi)$.

COMPARATIVE EXAMPLE 3

The general procedure of Example 1 is repeated using only HDPE L5005 (product of Equistar Chemicals, LP) having a density of 0.949 g/cm³ and $MI_2$ of 0.05 dg/min. The film has a measured thickness of 101 microns, a modulus in the machine direction of 118,000 psi, TD tear strength of 360 grams, and MD tear strength of 180 grams.

The obtained $TS_{MD}$ of 180 g is well below the value of 222 g calculated from the equation $TS_{MD}=1544-(11.2)(mod_{MD}/1000\ psi)$.

While the modulus values are similar, the $TS_{MD}$ of Example 2 is more than double the $TS_{MD}$ of Comparative Example 3, showing the remarkable improvement achieved with films of the invention versus films from a single polyethylene resin.

COMPARATIVE EXAMPLE 4

The general procedure of Example 1 is repeated using only MDPE XL3805 (product of Equistar Chemicals, LP) having a density of 0.938 g/cm³ and $MI_2$ of 0.05 dg/min. The film has a measured thickness of 103 microns, a modulus in the machine direction of 92,100 psi, TD tear strength of 570 grams, and MD tear strength of 450 grams.

The obtained $TS_{MD}$ of 450 g is well below the value of 512 g calculated from the equation $TS_{MD}=1544-(11.2)(mod_{MD}/1000\ psi)$.

At the same modulus, the $TS_{MD}$ of Example 1 is 80% higher than the $TS_{MD}$ of Comparative Example 4, showing the remarkable improvement achieved with films of the invention versus films from a single polyethylene resin.

COMPARATIVE EXAMPLE 5

The general procedure of Example 1 is repeated using HDPE L5005 having a density of 0.949 g/cm³ and $MI_2$ of 0.05 dg/min. and LLDPE Petrothene® Select LLDPE dry blended in a weight ratio of 85:15 and melt extruded. The film has a measured thickness of 99 microns, a modulus in the machine direction of 101,000 psi, TD tear strength of 380 grams, and MD tear strength of 350 grams.

The obtained $TS_{MD}$ of 350 g is well below the value of 413 g calculated from the equation $TS_{MD}=1544-(11.2)(mod_{MD}/1000\ psi)$.

COMPARATIVE EXAMPLE 6

The general procedure of Comparative Example 5 is repeated using HDPE L5005 and LLDPE in a weight ratio of 67:33. The film has a measured thickness of 101 microns, a modulus in the machine direction of 84,700 psi, TD tear strength of 960 grams, and MD tear strength of 490 grams.

The obtained $TS_{MD}$ of 490 g is well below the value of 595 g calculated from the equation $TS_{MD}=1544-(11.2)(mod_{MD}/1000\ psi)$.

Examples 1 and 2 versus Comparative Examples 5 and 6 show the remarkable improvement in MD tear strength versus other polyolefin blends in which the HDPE component has a density below 0.955.

COMPARATIVE EXAMPLE 7

Thin films (13 micron nominal thickness) were prepared from different grades of HDPE with LLDPE Petrothene Select LLDPE. The results are tabulated in Table 1. They show that thins films prepared with L5906 HDPE having a density greater than 0.955 do not have superior MD tear strength versus other polyolefin blends in which the HDPE component has a density below 0.955. They are also not superior to thin films from a single polyethylene resin.

TABLE 1

| | Thin Film Results (Comparative Examples) | | | | | |
|---|---|---|---|---|---|---|
| HDPE | HDPE density | HDPE wt % | LLDPE wt % | Modulus$_{MD}$ psi | TS$_{TD}$ g | TS$_{MD}$ g |
| L5906 | 0.959 | 54 | 46 | 83,000 | 90.2 | 15.2 |
| L5906 | 0.959 | 80 | 20 | 125,000 | 38.7 | 13.2 |
| L5906 | 0.959 | 100 | 0 | 145,000 | 22.7 | 12.1 |
| L5005 | 0.949 | 67 | 33 | 80,000 | 95 | 18.3 |
| L5005 | 0.949 | 85 | 15 | 109,000 | 38.1 | 17.7 |
| L5005 | 0.949 | 100 | 0 | 132,000 | 18.2 | 16.2 |
| XL3805 | 0.938 | 100 | 0 | 91,000 | 38.5 | 16.8 |

The thick film results of Examples 1 and 2 are surprising and different from the Comparative Example 7 thin film results. There is no advantage in $TS_{MD}$ seen when HDPE having a density greater than 0.955 is used in blends to make thin films.

The preceding examples are meant only as illustrations. The following claims define the invention.

I claim:

1. A film produced from a polyolefin blend that has a density from 0.935 to 0.955 g/cm³, said blend comprising:
   (a) greater than 50 wt. % of HDPE having a density greater than 0.955 g/cm³ and an $MI_2$ less than 1.0 dg/min.; and
   (b) LLDPE having a density from 0.900 to 0.925 g/cm³ and an $MI_2$ less than 5.0 dg/min.;
   wherein the film has a thickness from 50 to 200 microns, a modulus in the machine direction (mod$_{MD}$) from about 75,000 to about 130,000 psi, a tear strength in the transverse direction (TS$_{TD}$) greater than in the machine direction (TS$_{MD}$), and a TS$_{MD}$ expressed in grams and measured at a film thickness of 100 microns, defined by:

$TS_{MD}>1544-(11.2)(mod_{MD}/1000\ psi)$.

2. The film of claim 1 wherein the LLDPE is an ethylene-hexene copolymer.

3. The film of claim 1 wherein the polyolefin blend has from about 10 to about 49 percent by weight LLDPE.

4. The film of claim 1 wherein the polyolefin blend is prepared by melt extrusion.

5. The film of claim 1 wherein the polyolefin blend has a density from 0.940 to 0.950 g/cm³.

6. The film of claim 1 wherein the LLDPE has an $MI_2$ from 0.5 to 2.0 dg/min.

7. The film of claim 1 having a thickness from 100 to 200 microns.

8. A film produced from a polyolefin blend that has a density from 0.935 to 0.955 g/cm³, said blend comprising:
   (a) greater than 50 wt. % of HDPE having a density greater than 0.955 g/cm³ and an $MI_2$ less than 1.0 dg/min.; and
   (b) LLDPE having a density from 0.900 to 0.925 g/cm³ and an $MI_2$ less than 5.0 dg/min.;
   wherein the film has a thickness from 50 to 200 microns, and a tear strength in the machine direction (TS$_{MD}$) greater by at least 20% than that of a film with the same modulus prepared from a single polyethylene resin.

* * * * *